United States Patent [19]

Idaszak

[11] 4,021,927

[45] May 10, 1977

[54] PROCESS FOR FLUIDIZATION

[75] Inventor: Leo R. Idaszak, Palos Heights, Ill.

[73] Assignee: CPC International Inc., Englewood Cliffs, N.J.

[22] Filed: Nov. 21, 1975

[21] Appl. No.: 634,208

Related U.S. Application Data

[63] Continuation-in-part of Ser. No. 526,784, Nov. 25, 1974, Pat. No. 3,967,975, and a continuation-in-part of Ser. No. 573,604, April 30, 1975, abandoned.

[52] U.S. Cl. .................................. 34/10; 34/12; 110/8 F
[51] Int. Cl.² .......................................... F26B 3/08
[58] Field of Search ............ 34/10, 12, 60, 57 A; 127/23; 110/8 F

[56] References Cited

UNITED STATES PATENTS

| | | | |
|---|---|---|---|
| 3,003,894 | 10/1961 | Fredrickson | 127/23 X |
| 3,360,866 | 1/1968 | Shirai | 34/57 A |
| 3,411,465 | 11/1968 | Shirai | 34/10 |
| 3,613,256 | 10/1971 | Belopolsky et al. | 34/57 A |
| 3,735,498 | 5/1973 | Suzukawa et al. | 34/10 |

Primary Examiner—John J. Camby

[57] ABSTRACT

A fluidization process, particularly well suited for the fluidization of solids difficult to fluidize, wherein the solids are introduced to either an upper or lower fluidized zone while continuously subjecting both the upper and lower fluidized zones to mechanical agitation. The solids flow from the upper fluidized zone downwardly against the fluidizing gas through a plurality of tubular fluidized zones positioned intermediate to the upper and lower fluidized zones wherein the fluidized solids are subjected to heat transfer. The solids flowing from the intermediate tubular zones pass to the lower agitated zone. The process of the invention can be used for a variety of fluidization operations, including physical processes such as drying and chemical processes, and particularly fluidization processes for drying and/or chemically modifying starches.

53 Claims, 3 Drawing Figures

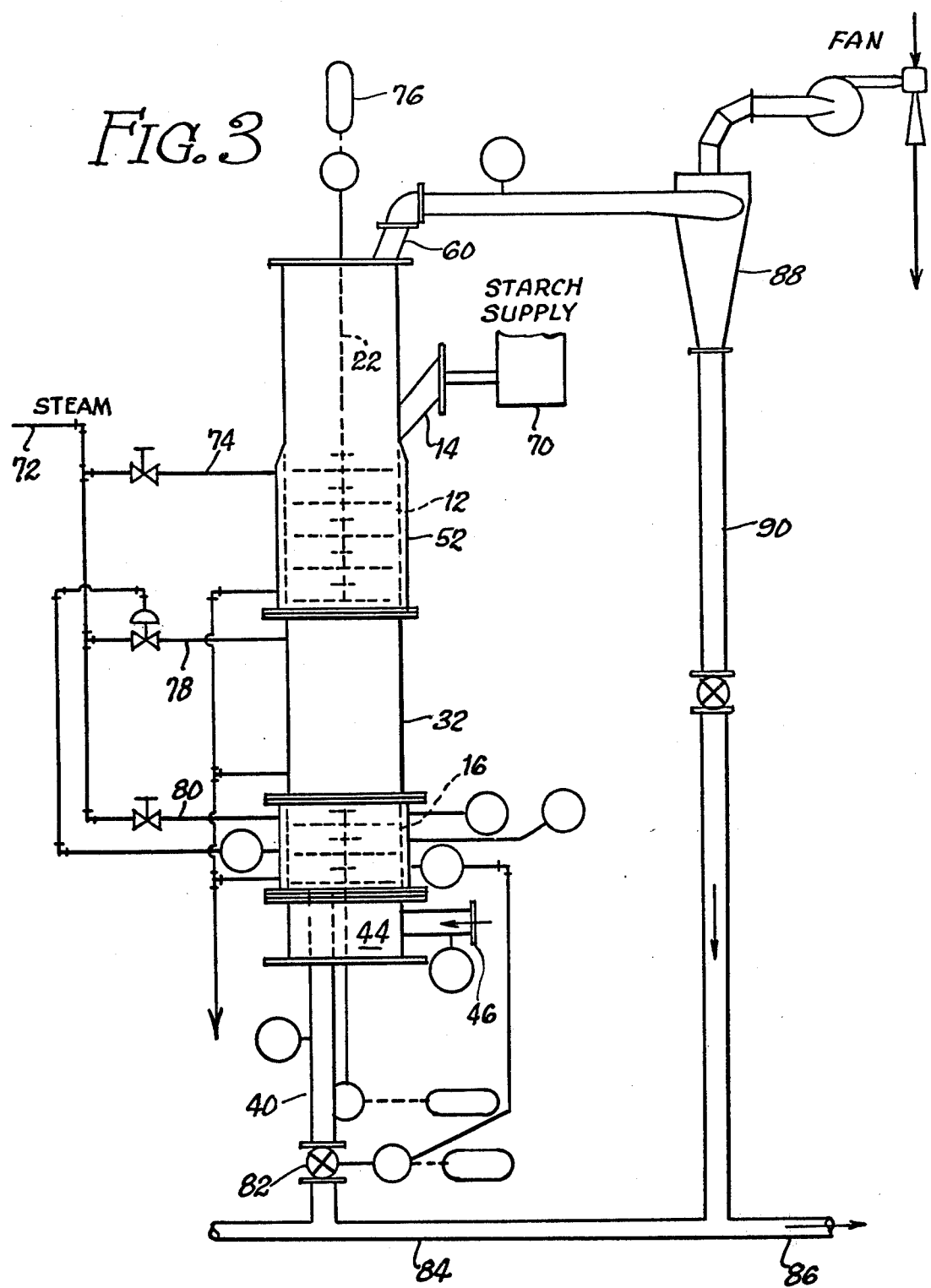

PROCESS FOR FLUIDIZATION

CROSS REFERENCE TO RELATED APPLICATIONS

This is a continuation-in-part of copending application Ser. No. 526,784, filed Nov. 25, 1974, now U.S. Pat. No. 3,967,975, and application Ser. No. 573,604, filed Apr. 30, 1975, now abandoned.

BACKGROUND OF THE INVENTION

1. Field of the Invention

The present invention relates to a process for fluidization, and more particularly, to a process for fluidization of materials which are difficult to fluidize.

2. Description of the Prior Art

Various types of fluidization processes have been used for many years for a number of different unit operations and/or unit processes, including chemical reactions and drying operations. In the usual fluidized system, a solid phase is suspended in an upwardly moving fluid stream, usually a gas stream, whereby the mass of solid particles have the appearance of a boiling liquid. The solid phase may be a catalyst to promote a chemical reaction, with the reactants being contained in the fluidizing gas, or the solid phase may be a material which is reactive with the fluidizing gas. Alternatively, the solid phase may be a material which is treated by the fluidizing gas as in the case of fluidized drying.

One of the primary advantages of fluidized bed systems resides in the fact that the high turbulence existing in a fluidized bed provides high heat transfer characteristics. In addition, that turbulence in the fluid bed causes complete mixing of the solids with the fluidizing gas to form a relatively homogeneous gas-solid system.

Fluidized bed systems are, however, not without some disadvantages. As is now well known to those skilled in the art, the use of fluidized systems frequently results in channeling, a phenomenon caused by the formation of pockets in the solid phase which in turn results in the passage of gas through the solids forming the bed without intimate contact with the solid phase.

The problem in channeling in a fluidized bed system can be partially minimized by the use of a plurality of tubular zones through which the fluidizing gas is passed in contact with the solid phase. Each tube thus operates as an individual fluidized bed having a much smaller cross sectional area. Such tubular bed systems have even greater heat transfer characteristics because the plurality of tubular zones increase the surface available for heat transfer.

However, the use of a plurality of tubular zones, has not found acceptance in the fluidization of materials which, because of their cohesive characteristics, tend to form aggregates and are consequently difficult to fluidize. The difficulty in fluidizing such materials has been explored by Gelhart in "Types Of Gas Fluidization", *Powder Technology*, 7, pp. 285–292 (1973). In that publication, the author classifies solids into groups A through D, inclusive, characterizing materials having a small means size and/or a particle density less than 1.4 g/cm$^3$ as group A materials. Group B materials are described as having a means size ranging from 40 $\mu$m to 500 $\mu$m and a density ranging from 1.4 to 4 g/cm$^3$. Materials of the groups A and B do not present unusual problems from the standpoint of fluidization. Groups C and D, on the other hand, present the most severe fluidization problems, the group C materials being cohesive and as a result, tending to plug small diameter tubes.

Gelhart points out that fluidization of such materials can be made possible or improved by the use of mechanical stirrers or vibrators to minimize channeling in the fluid bed. However, the author points out that one of the more effective means to avoid difficulties with such materials is the addition of extraneous solids to the system.

There are a number of solid materials which fall into the groups C and D categories as outlined above. Starch is one example of a group C material since starch tends to be quite cohesive, and thus tends to plug small diameter tubes. Attempts have been made in the prior art to process starches in a fluidized bed system. For example, in U.S. Pat. No. 2,845,368, there is described a process for the conversion of starch to dextrin in a fluidized bed system in which the fluidized reactor includes a plurality of heat transfer tubes contained in the reactor to supply heat to the starch undergoing conversion. One of the primary difficulties with a system of the type described in the foregoing patent is that the starch, when contacted with an acid catalyst, tends to form lumps or agglomerates within the fluidized bed reactor to an even greater extent. Thus, the inherent cohesiveness of starch coupled with the increased tendency for starch to agglomerate when contacted with a catalyst results in severe channeling. Channeling, in turn, results in incomplete conversion of the starch to dextrin.

In addition, reactors used in the dextrinization of starch are frequently characterized by a "dead zone" at the upper portion of the reactor where the starch may lay and be subjected to high temperatures for extended periods. Auto ignition can occur, causing fire and/or explosions. This problem can be particularly aggravated in apparatus of the type taught by the foregoing patent for the heat transfer surfaces present in the fluidized bed reactor, when present in sufficient surface area to provide the necessary heat exchange, disrupts the fluid flow within the reactor to cause the formation of such "dead zones".

OBJECTS OF THE INVENTION

It is accordingly an object of this invention to provide a process for the fluidization of solids difficult to fluidize which overcomes the foregoing disadvantages.

It is a more specific object of the invention to provide a process for the fluidization of solids difficult to fluidize which is characterized by the absence of "dead zones", improved homogeneity and improved heat transfer characteristics.

It is a further object of the invention to provide a process for fluidization of starches in the production of starch conversion products by processes wherein the starches are efficiently converted with relatively short residence times while minimizing thermal degradation and risks of explosion and/or fire.

These and other objects and advantages of the invention will appear more fully hereinafter, and, for purposes of illustration but not of limitation, an embodiment of the invention is shown in the accompanying drawings as described hereinafter.

SUMMARY OF THE INVENTION

The present invention is directed to a process for the fluidization of solid materials difficult to fluidize, particularly solid particulate materials which have a tendency to adhere or agglomerate to form cohesive masses. The present invention contemplates chemical and/or physical processes in which such particulate materials are fluidized and subjected to heat transfer during fluidization, usually to supply heat thereto.

In accordance with the practice of the invention, use is made of a fluidization system including an upper, agitated fluidized zone and a lower, agitated fluidized zone, with an intermediate fluidized zone formed of a plurality of tubular zones communicating with each of the upper and lower fluidized zones whereby fluidizing gas is passed upwardly through the lower, agitated fluidized zone, through the intermediate zone and into the upper, agitated fluidized zone to fluidize the solids in each of the three zones.

The heat transfer to or from the fluidized system takes place predominantly in the intermediate zone. The small diameter tubular zones forming the intermediate zone is provided with heat exchange means, and the small diameters of the plurality of tubular zones provide high heat transfer area.

The fluidization process of the present invention is particularly well suited to the processing of starches, including starch dextrinization, starch oxidation, etc., since starches are cohesive and thus are difficult to fluidize. The invention also contemplates physical as well as chemical processes, such as drying. Starches can be effectively dried in the practice of the invention. In addition, other physical and/or chemical processes can be carried out on other solids difficult to fluidize including coal, etc.

BRIEF DESCRIPTION OF THE DRAWINGS

FIG. 3 is a schematic illustration of the process of the invention.

DESCRIPTION OF THE PREFERRED EMBODIMENTS

Figure 1:
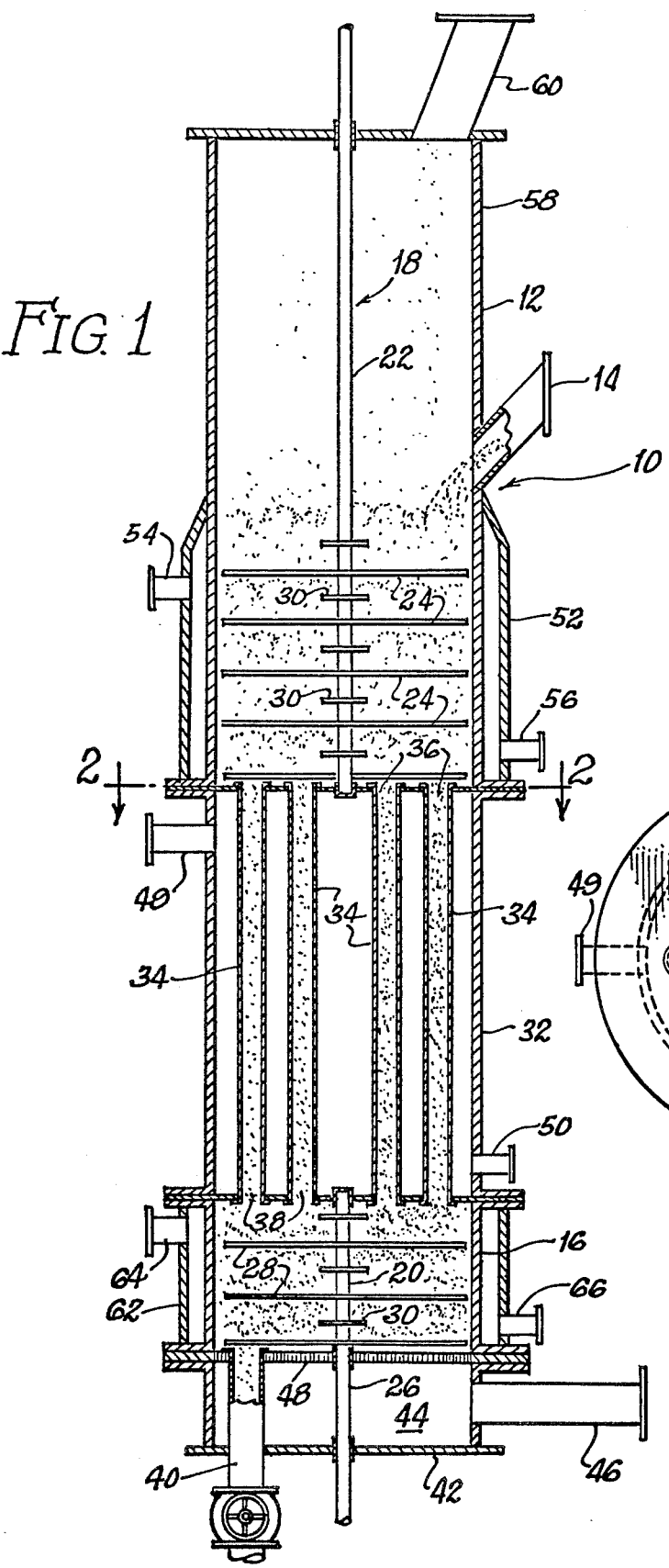
FIG. 1 is a sectional view of a fluidized bed reactor suitable for use in the process of the invention.

In accordance with one embodiment, the concepts of the present invention are applied in converting starch to dextrin in an acid catalyzed reaction at an elevated temperature wherein the starch is introduced to a fluidized zone which is continuously agitated. From that fluidized zone, the starch is passed, either concurrently or preferably countercurrently, with the fluidizing gas through a plurality of tubular fluidized zones and into another fluidized zone which is likewise subjected to agitation.

In the preferred practice of the invention, the starch is introduced to an upper fluidized zone and is continuously agitated in that upper fluidized zone. From the upper fluidized zone, the starch is passed downwardly countercurrently with the fluidizing gas through the plurality of tubular fluidized zones into a lower fluidized zone which is likewise agitated. The product formed is removed from the lower fluidized zone.

One of the important features of the process of this invention is that both the upper and lower fluidized zones are vigorously agitated to insure complete mixing in both the upper and lower zones. That agitation not only serves to prevent channeling and thus avoid incomplete conversion of the starch, it also operates to prevent the buildup of so-called "dead zones" in the reaction vessel and thereby avoid scorching and undesirable thermal degradation of the starch.

The preferred apparatus for use in the practice of this invention is described in detail in the copending application Ser. No. 526,784, filed Nov. 25, 1974, now U.S. Pat. No. 3,967,975, the disclosure of which is incorporated herein by reference. The apparatus described in that copending application is shown in the drawings herein to illustrate a preferred apparatus for the practice in the process of this invention.

As is well known to those skilled in the art, dextrins are the products of starch degradation obtained by heating starch in a relatively dry state in the presence or absence of an acid. Normally, corn starch contains from about 10% to about 12% by weight moisture; during the dry heating of naturally dry starch, that moisture is removed, whereupon dextrinization and branching commences. During the dextrinization reaction, both hydrolysis and condensation are effected. Branching occurs as a result of repolymerization of partially hydrolyzed starch when the moisture in the starch is below about 3% by weight.

The term dextrose equivalent value (D.E.) is used herein to refer to the reducing sugars content of the dissolved solids in a starch hydrolysate or dextrin expressed as percent dextrose as measured by the Schoorl method (*Encyclopedia of Industrial Chemical Analysis*, Vol. 11, pp. 41–42). Starch dextrins generally have a dextrose equivalent value of less than about 7, and most frequently, in the range from about 1 to 7.

Untreated starch normally has a degree of branching of about 3.6%. Dextrins, on the other hand, usually have a degree of branching of at least 7%, usually 7% to 16%.

The degree of branching in a dextrin is determined by three types of analyses, i.e., dextrose equivalent value (Schoorl's D.E. discussed hereinabove), dry substance, and the amount of formic acid formed on periodate oxidation. The latter analysis, also known as formic acid value (FAV) expressed as milliequivalents of formic acid per gram dry substance, is determined by low temperature oxidation (2° C) with sodium metaperiodate under rigidly controlled conditions. This method is more fully described by R. W. Kerr and F. C. Cleveland, *J. Am. Chem. Soc.*, 74, 4036–4039 (1952) and by the same authors in Die Starke, 5, 261–266 (1953), the disclosure of which are incorporated herein by reference.

Periodate oxidation produces one molecule of formic acid from each non-reducing terminal glucose unit and two molecules of formic acid from each reducing terminal glucose unit. Thus, changes in the FAV when calculated on a mole basis indicate degree of branching in dextrin. From the foregoing three analyses, the degree of branching is calculated as follows:

1. Calculate number average molecular weight (Mn):

$$\bar{M}n = \frac{20{,}500}{D.E.}$$

Note: Correction of D.E. for dextrose in dextrin is disregarded because the amount of dextrose present in dextrins is negligible.

2. Convert formic acid value (FAV) from milleequivalents per g.d.s. to equivalents per mole:

$$FAV, \text{eg/mole} = FAV, \text{meq/g.d.s.} \times \frac{\overline{Mn}}{1,000}$$

3. Calculate number of branches per mole;

$$\text{Branches/mole} = \frac{FAV, \text{eg/mole} - 3}{1}$$

Note: Periodate oxidation produces one formic acid molecule from each non-reducing end group and two molecules of formic acid from each reducing end group.

4. Calculate total linkages per mole;

$$\text{Linkages/mole} = \frac{\overline{Mn} - 18}{162} - 1$$

5. Calculate degree of branching:

$$\text{Branching, \%} = \frac{\text{Branches/mole}}{\text{Linkages/mole}} \times 100$$

The formula for starch dextrin can be written as $(C_6H_{10}O_5)_n$, where $n$ is a variable (rather than a mathematical constant) and smaller than the value for $n$ in starch. Dextrins are obtained in several different grades by heating starch for varying lengths of time at temperatures ranging up to about 240° C. The amylodextrin, erythrodextrin, achrodextrin, and so forth, produced by this means may be graded roughly as to molecular size by the standard iodine test.

The dextrinization reaction can be catalyzed by treating the naturally dry starch with an acid either before or during the heating of the starch. Any acid may be utilized for this purpose, such as sulfuric acid, sulfurous acid, hydrochloric acid, and the like. Preferably, aqueous dilute hydrochloric acid or anhydrous hydrogen chloride gas is sprayed onto the starch particles before or during the heating process. Other chemicals, such as Borax, may also be incorporated into the starch during the dextrinization process.

DETAILED DESCRIPTION OF THE DRAWINGS

Referring now to the practice of this invention, there is shown in FIG. 1 in detail a cross sectional view of the fluidized apparatus preferably used in the practice of this invention. The apparatus includes an elongate vertical housing designated as 10 which defines in its upper portion, an upper chamber 12 having inlet means 14 to supply the starch. The housing 10 also defines a lower chamber 16 positioned at substantially the bottom. Both of the upper chamber 12 and the lower chamber 16 include agitator means 18 and 20, respectively. The agitator means 18 includes a shaft 22 mounted for rotation within the upper chamber 12. Mounted on shaft 22 for rotation therewith are a plurality of impellers 24 which may be in the form of flat paddles rotatable with the shaft 22. The agitator means 20 in the lower chamber 16 similarly includes a rotatable shaft 26 having impellers 28 mounted for rotation therewith.

In the preferred practice of this invention, the agitating means 18 is formed with multi-bladed upthrust impellers 24 at staggered locations, with additional impellers 30 being mounted at a 90° angle between each of the impellers 24 when two-bladed impellers are used. The agitating means 20 in the lower chamber 16 preferably has a similar configuration. If desired, some or all of the impellers can be disposed at angle with respect to those illustrated depending on the number of blades per impeller.

Positioned in the housing 10 in an intermediate section 32 are a plurality of tubes 34 having an upper end 36 communicating with the upper chamber 12 and a lower end 38 communicating with the lower chamber 16. In this way, starch introduced to the inlet 14 flows by gravity downwardly through the upper chamber 12 through the plurality of tubes 34 and into the lower chamber 16. The lower chamber 16 also includes outlet means 40 to withdraw starch dextrin therefrom.

Positioned below the lower chamber 16 is a housing 42 defining a plenum chamber 44. Fluidizing gas is introduced to the plenum chamber through fluidizing gas inlet means 46, and passes through an opening 48 into the lower chamber 16.

Figure 2:
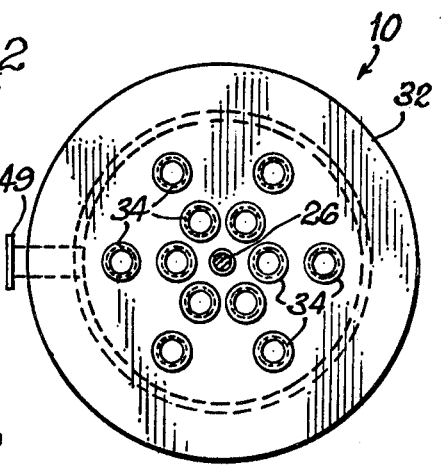
FIG. 2 is a sectional view taken along lines 2—2 in FIG. 1.

The arrangement of the tubes in the intermediate section 32 can be varied considerably. One suitable arrangement for the tubes 34 in the section 32 is shown in FIG. 2 of the drawing. As shown in this figure, the tubes 34 are arranged in a pattern about the center of the section 32.

At least the tubular section is provided with means to supply and/or remove heat therefrom. For this purpose, the section 32 preferably defines a jacket for heat exchange media which can be supplied to the section 32 by inlet means 49 and removed from the section or jacket 32 by outlet means 50 as shown in FIG. 1. It is also desirable in many instances to employ heat exchange means with the upper and lower chambers. For this purpose, it is generally sufficient to provide a jacket 52 surrounding the upper chamber 12, with the jacket 52 including inlet means 54 to supply heat exchange media to the jacket 52 and outlet means 56 to remove heat exchange media from the jacket 52.

As is shown in FIG. 1 of the drawing, it may be sufficient that the heat exchange jacket 52 for the upper chamber 12 extend only up to the inlet means 14, or it may be desirable to jacket the entire upper section to prevent condensation. However, it is generally preferred that the upper chamber 12 include a dome portion 58 integral therewith from which the fluidizing gas may be removed from the reactor by means of outlet means 60. As will be appreciated by those skilled in the art, not only is the fluidizing gas removed from the outlet means 60, but any "fines" entrained in the fluidizing gas are carried out with it through the outlet means 60. As will be appreciated by those skilled in the art, it is possible, and sometimes desirable, to form the upper chamber with an increased sectional area to reduce the linear velocity of the fluidizing gas to thereby assist in the separation of entrained particles of the solid phase. The cross sectional area of the dome itself may be increased, or, the cross sectional area of the entire chamber 12 may be increased for this purpose.

The lower chamber 16 may likewise be provided with heat exchange media, preferably in the form of a jacket 62, to which heat exchange media is supplied through inlet means 64 and from which the heat exchange media can be removed from outlet means 66.

The process for the conversion of starches to dextrin is illustrated in FIG. 3 of the drawing. As shown in this figure, the supply of starch, preferably containing an acid catalyst, is fed from a hopper 70 to the inlet means 14 for introduction to the upper chamber 12. In the preferred practice of the invention, steam is introduced through lines 72 and 74 into the heat exchange jacket 52 to supply heat to the upper chamber. The shaft 22 of the agitating means 18 can be driven by suitable means 76 as shown in FIG. 3.

The catalyst-containing starch is fluidized by humid air introduced to the plenum chamber 44 through the inlet means 46 and passes upwardly through the lower chamber 16, through the tubes 34 in the intermediate section 32 and into the upper chamber 12. Steam as a heat exchange medium is also supplied through lines 78 to the jacket of section 32, and also through line 80 to the jacket 62 surrounding the lower chamber 16. In this way, the upper and lower chambers as well as the tubular section are supplied with steam to heat the starch passing therethrough.

Thus, the acidified starch supplied to the inlet means 14 is immediately fluidized in the upper chamber 12 while the upper chamber 12 is continuously agitated against the action of the fluidizing medium downwardly through the upper chamber while subjected to agitation. The acidified starch continues its downward flow by gravity against the suspending action of the air through the tubes 34 in which there is no agitation, except for that which occurs naturally due to the inherent turbulence in the tubes containing the fluidized starch. After descending through the tubes 34, the starch, at least partially converted to dextrin, continues its descent into the lower chamber 16 against the action of the fluidizing gas, and it is removed from the lower chamber 16 through the outlet means 40.

In one embodiment of the practice of this invention, the product removed through line 40 is passed through a rotary air lock 82 into a pneumatic cooling tube where the temperature of the product is lowered to below 150° F. For this purpose, the product is discharged through the rotary air lock 82 into the cooling tube 84 and to collection equipment through line 86. Dust or fines discharged through the discharge means 60 is removed by means of a cyclone 88, and is thus transported by dust discharge line 90 to the collection equipment through line 86.

The starch which is dextrinized in accordance with the process of this invention may be derived from a variety of starchy materials, including cereal starches, waxy starches and/or root starches. Typical of such starch materials are non-waxy cereal starches (i.e., corn starch and wheat starch), potato starch, tapioca starch, grain sorghum starch, rice starch; waxy starches (i.e., waxy milo starch, waxy maize starch), etc. The non-waxy cereal starches are preferred, with corn starch being particularly preferred.

In the preferred practice of the invention, the starch is blended with an acid catalyst prior to introduction to the agitated fluidized bed. Hydrogen chloride or hydrochloric acid are preferred, although any acid may be used for this purpose, including sulfuric acid, sulfurous acid and the like. The acid is blended with the starch, preferably by spraying a weighed amount of acid on a bed of starch while continuously blending the starch to provide a homogeneous acidified starch mixture. The use of a ribbon blender has been found to be particularly well suited for this purpose.

The amount of acid blended with the starch is not critical and can be varied within wide limits, depending in part on the type of starch employed and the type of dextrin produced. In general, amounts of an acid corresponding to the range of 0.01 to 10 parts by weight of 20° Be' HCl per 1000 parts by weight of starch c.b., corresponding approximately to average past acidities expressed as milliequivalents of acid per gram of starch (dry basis) of 0.001 to 0.10.

The acidified starch is then passed through the apparatus described hereinabove while maintained at a temperature which is dependent somewhat on the type of dextrin to be produced. In general, the starch is maintained at a temperature within the range of 125°–380° F, and preferably 170° –375° F in the fluidized bed reactor. In general, the residence time of the starch in the fluidized bed reactor of this invention is less than one hour, and most frequently ranges from 10 to 30 minutes, although longer or shorter residence times may be employed depending somewhat on the grade of dextrin desired and the degree of conversion sought.

If desired, the air as the fluidizing gas may be heated externally, depending on the grade of dextrin to be produced, although there is frequently little advantage in doing so. In general, the fluidized bed can be heated to a temperature within the range from 85°–350° F. For example, when canary dextrin is to be produced, temperatures within the range of 225° –335° F are usually preferred. The air supplied as the fluidizing gas preferably contains moisture to more efficiently promote the conversion reaction.

As will be appreciated by those skilled in the art, other fluidizing media can be used. For example, steam or inert gases such as argon, nitrogen, carbon dioxide, etc., preferably containing some moisture can be used. In addition, flue gases from combustion operations can similarly be used as the fluidizing medium, if desired. It is not essential that the fluidizing medium add any sensible heat to the starch undergoing dextrinization since the tubular section of the reactor employed with the concepts in the practice of this invention in the dextrinization of starches is capable of providing all of the heat necessary to efficiently effect the reaction.

In accordance with another embodiment of the invention, the fluidization process described herein can also be employed in the treatment of starches to produce bleached starches and oxidized starches. As is now well known to those skilled in the art, bleached starches are starches produced by oxidative treatment which leads to a marked whitening of the starch. In general, the severity of the oxidation treatment is controlled so that the carotene, xanthophyll and related pigments occurring naturally in the starch are efficiently oxidized to colorless compounds while the starch produced is only slightly oxidized (D.S. $\leq$ 0.1) as later defined (if at all). Bleaching is preferably carried out in a dry state, and accordingly, a wide variety of oxidizing agents may be used, provided that the oxidizing agent is one which is mild enough under the reaction conditions so as to avoid excessive oxidation of the starch but strong enough to insure that the pigments themselves will be effectively oxidized. Examples of usable bleachable agents include, without limitation, chlorine, bromine, alkali metal hypochlorites, alkali metal permanganates, ozone, alkali metal chlorites or alkali metal chlorites in combination with alkali metal persulfates. Methods of bleaching starches are discussed in greater detail in "Chemistry and Industries of Starch", Second Edition, R. W. Kerr, Editor, Academic Press, Inc., New York (1950).

Oxidized starches are starches produced from the oxidative treatment of the starch which leads to chemical changes in the starch. For example, oxidation of primary alcohol groups to carboxyl groups, of aldehyde groups to carboxyl groups, of secondary alcohol groups to ketone groups, and of glycol groups to carboxyl groups occur. The oxidation of starch leads to a starch product which is more easily solubilized and which exhibits a lower viscosity when solubilized in water. Oxidation may be carried out by utilizing any of a number of oxidizing agents. Often the oxidizing agents used to form oxidized starch are the same agents that are used to bleach starch. Harsher reaction conditions such as higher temperatures, longer contact times, different pH, etc., are used to cause these agents to react with the starch molecules rather than just the carotene, etc. Reagents used in the oxidation of starch include, but are not limited to air, bleaching powder, halogens, chloramines, chloric acid, chlorates, chromic acid, ferric-chloride, hydrogen peroxide, hypochlorite, manganese dioxide, nitric acid, nitrogen dioxide, perborates, periodic acid, persulfates, potassium dioxide, potassium permanganate, silver oxide, p-toluene sulfochloramide and zinc oxide. Methods of oxidizing starch are also disclosed in more detail in the previously cited text, "Chemistry And Industry Of Starch".

The repeating anhydroglucose units in starch may have different degrees of substitution (D.S.), i.e., from one to three, and starch derivatives are generally categorized in terms of their D.S. In a given quantity of a starch derivative, there will generally be some anhydroglucose units that are not substituted at all (i.e., D.S. $\leq$ O), together with other anhydroglucose unist that have different degrees of substitution, from 1 to 3. A statistical average is employed to characterize the average D.S. of the entire quantity, although the figure is ordinarily stated as the D.S. rather than the average D.S. The oxidized starch treated according to this invention may have a varying range of D.S. (carboxyl substitution) which may be as little as 0.0001, up to the maximum level of 3.0. Irrespective of the number of molecules of starch which are reacted, or the actual sequence of substitution, or the number of anhydroglucose units involved, the general formula is intended to represent products where the substitution may occur to various degrees of substitution at all or less than all anhydroglucose units in all or less than all starch molecules.

The distinction between oxidized and bleached starches is now well known to those skilled in the art, particularly the corn wet milling industry. Such a distinction is described in U.S. Pat. No. 3,598,622, the disclosure of which is incorporated herein by reference.

In general, the distinction between the oxidation of starch and the bleaching of starch is directly related to the severity of the reaction conditions. It has been found that oxidation of the starch generally occurs where the temperature of the starch undergoing conversion was maintained at temperatures higher than 200° F, and preferably 200°–400° F. While the conversion is also related to the amount of oxidizing agent employed, it has been found that the reaction temperature largely dictates whether the reaction is a bleaching reaction or an oxidation reaction. However, to effect oxidation, it is preferable to employ an oxidizing agent in an amount within the range of from 0.5 to 5% of oxidizing agent based on the weight of the starch, dry basis. At temperatures below 200° F, the reaction is predominantly a bleaching reaction, and the starch is affected to a minimal extent. In general, bleaching of starch is carried out at a reaction temperature of at least 80° F, and preferably 80°–220° F, with an amount of oxidizing agent ranging from 0.05 to 2%, based upon the weight of the starch, dry basis.

In carrying out the fluidization process of this invention for the oxidation or bleaching of starch, it is generally preferred to introduce the starch, which has been blended with the oxidizing and/or bleaching agent, into the upper agitated fluidized zone, from which the starch is allowed to pass downwardly from the upper, agitated fluidized zone against the fluidizing gas through a plurality of tubular fluidized zones into a lower fluidized zone while the starch is being agitated in both the upper and lower fluidized zones. The oxidized or bleached starch is thus recovered from the lower fluidized zone. As in the case of dextrinization, the vigorous agitation in the upper and lower fluidized zones serves not only to prevent channeling and thus avoids incomplete conversion of the starch, it also operates to prevent the buildup of so-called "deal zones" in the reaction vessel to thereby avoid scorching and undesirable thermal degradation of the starch.

Alternatively, the starch, blended with the oxidizing or bleaching agent, can also be supplied to the lower fluidized zone whereby the starch is passed upwardly from the lower fluidized zone through the tubular zones and into the upper fluidized zones concurrently with the fluidizing gas. In the practice of this invention, the oxidized or bleached starch is thus recovered from the fluid system from the upper fluidized zone.

The heat supplied to the bleaching or oxidizing reaction is supplied through the heat exchange media surrounding the tubular zones. Because of the high surface area for heat transfer afforded to the tubular zones, it is unnecessary to heat either the upper or lower agitated fluidized zones.

In general, the residence time of the starch in the fluidized bed reactor is less than one hour, both for the production of oxidized starches and the production of bleached starches. Most frequently, the residence time ranges from 10 to 30 minutes, depending upon whether oxidation or bleaching is desired.

In accordance with another embodiment of this invention, the fluidization process can also be used in the drying of starch or like cohesive solid particles. It has been found that the fluidization process of this invention is capable of use in the drying of starches and like materials which are cohesive in character and consequently difficult to fluidize. The fluidization process of the present invention provides remarkable energy and cost reductions over drying processes for starch now in use.

As is well known to those skilled in the art, flash drying is a method for drying starches at low cost because it minimizes the residence of starch to heat transfer. However, one of the significant disadvantages of flash drying as appied to starch or any other material is that a high $\Delta T$ or driving force for heat transfer is required because all of the energy for drying must enter with the gas or superheated vapor. In the flash drying of starches, it has generally been the practice to employ hot air with inlet temperatures ranging from 350°–500° F; that heated air serves as the source of heat as well as the carrier for the exit moisture.

The process of the present invention overcomes the disadvantages of flash drying since the fluidization process of the present invention is capable of providing extremely high surface area for heat transfer as well as high heat transfer coefficients due to the turbulence in the intermediate tubular zones of the fluidized system. At the same time, the process of this invention does not necessitate the use of a high ΔT as required in flash drying since the driving force needed to effect the desired degree of drying can be supplied by a heat transfer fluid in contact with the intermediate tubular fluidized zones.

In fact, it has been found that the fluidization process of this invention can be used in the drying of starch, using as the heat transfer fluid waste steam from turban-driven generators used to generate electrical power. Such steam is usually saturated at a pressure of only a few p.s.i. The ability to use exhasut steam in the drying of starch represents a significant economic advantage for it avoids the use of extremely high air temperatures characteristic of flash drying while fully utilizing low energy, exhaust steam.

In the practice of the fluidization process of this invention for drying, the starch or like material can be supplied either to the upper agitated fluidized zone or the lower agitated fluidized zone, and the dried starch recovered from the opposite zone. The fluidizing gas can be any of the fluidizing gases described above, although it is generally most economical to use air. Heat for the drying operation can be supplied solely by the heat exchange medium surrounding the intermediate, tubular zones which provide a high surface area for heat transfer, while at the same time providing high heat transfer coefficients due to the turbulence of the fluidized starch in the plurality of tubular zones. In general, use can be made of heat transfer media having temperatures ranging from 100°–500° F, depending upon the material being dried and the amount of moisture present.

The present invention, having been described in detail, the following specific examples are presented to illustrate additional embodiments of the process and the product thereof. It is to be understood that the examples are given for illustrate purposes only and not by way of limitation.

EXAMPLE 1

This example illustrates the use of an agitated fluidized bed reactor of the type illustrated in FIGS. 1 and 3 of the drawing, having 7 tubes in the intermediate section in the dextrinization of starch.

An acidified starch is prepared by feeding raw starch to a covered ribbon blender to which gaseous hydrochloric acid is subsequently added. The amount of hydrochloric acid added is determined by titration and it is reported as a titer which represents the milliliters of 0.1 N NaOH required to bring 20 grams of starch slurried in 100 milliliters of distilled water to a pH of 6. The acidified starch is introduced to the fluidized bed through the inlet means 14, and air is introduced to the plenum chamber 44.

Dextrins may be characterized as either white dextrins or canary dextrins. Further white dextrins may be either high solubles or low solubles. Solubles are reported as percent, and represents the amount of a 2-gram sample which dissolves after being suspended in 250 milliliters of water at 25° C and shaken for 1 hour.

Canary dextrins are classified as either thick (high viscosity) or thin (low viscosity). Dextrin viscosity is normally reported as fluidity. For example, a 3:4 fluidity, such as for Test 4050 in the table below, represents the following. Three parts by weight of dextrin sample are mixed with four parts by weight of water, heated in a steam bath for 30 minutes, then cooled to 25° C. Any evaporation of water, as determined by weighing, is compensated for by addition of water. The material is then strained through a No. 5029 nylon into a glass beaker and held at 25° C for a total cooling time of 1 hour. The material is then placed in a standard funnel at 25° C. Fluidity is normally reported in units of milliliters and represents the amount of material that flows out of the standard funnel in exactly 70 seconds. The borax fluidity method is the same as that described above, except that 10% by weight of the sample is substituted with borax ($Na_2B_4O_7 \cdot 10H_2O$).

As shown in the table below, a high soluble white dextrin (Test 4050), a low soluble white dextrin (Test 4060), a thin canary dextrin (Test 4064) and a thick canary dextrin (Test 4074) were produced:

| Test | 4050 | 4060 | 4064 | 4074 |
|---|---|---|---|---|
| Starch moisture, % | 10.7 | 10.7 | 10 | 11 |
| Starch titer, ml | 4.6 | 4.2 | 5.3 | 4.1 |
| Operating temperature, ° F | 275 | 200 | 310 | 325 |
| Nominal retention time, minutes | 15.3 | 14.8 | 13.3 | 12.6 |
| Air rate/tube, scfm[a]/tube | 5.5 | 5.5 | 5.5 | 5.5 |
| Air velocity, feet/second[b] | 2.1 | 2.1 | 2.1 | 2.1 |
| Jacket steam pressure, psig | 55 | 5 | 112 | 150 |
| Product moisture, % | 2.5 | 5.0 | 2.2 | 1.9 |
| Product solubles, % | 94.5 | 19.8 | 98.1 | 97.9 |
| Product fluidity, ml | 22[c] | 25[d] | 16[e] | 36[f] |

[a] scfm = standard cubic feet per minute.
[b] Based on inside tube diameter of 2.834 inches.
[c] 3:4 fluidity, as is.
[d] 1:3 10% borax fluidity, as is.
[e] 2:3 10% borax fluidity, as is.
[f] 1:2 10% borax fluidity, as is.

The fluid bed apparatus contained 7 tubes, the tubes having an inside diameter of 2.834 inches. The height of each tube was 5 feet.

EXAMPLE 2

This example illustrates another dextrinization reaction carried out in a fluidized bed system similar to that described in Example 1. The reactor employed is of the same type illustrated in FIGS. 1–3 of the drawing, and has 7 tubes in the intermediate section.

Using the procedure described in Example 1, an acidified starch is prepared by feedng raw starch to a blender along with gaseous hydrochloric acid as set forth in the following table. The amount of hydrochloric acid added is determined in the same manner as described in Example 1.

The acidified starch is then introduced to the fluidized bed through the inlet means 14 and air is introduced to the plenum chamber 14.

As is shown in the table, a highly soluble white dextrin (Test 5170), a low soluble white dextrin (Test 5268), a thin canary dextrin (Test 5199) and a thick canary dextrin (Test 5198) were produced.

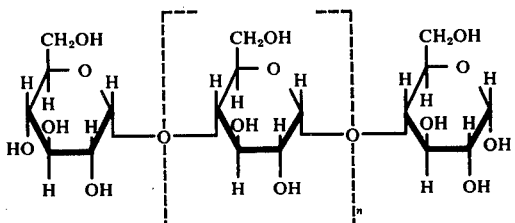

| Test | 5170 | 5268 | 5199 | 5198 |
|---|---|---|---|---|
| Starch moisture, % | 9.9 | 12.0 | 11.3 | 12.3 |
| Starch titer, ml | 4.3 | 4.5 | 5.0 | 4.7 |
| Operating temperature, °F | 278 | 214 | 323 | 321 |
| Nominal retention time, minutes | 12.0 | 9.8 | 23.2 | 21 |
| Air rate/tube, scfm[a]/tube | 3.3 | 3.6 | 3.1 | 3.1 |
| Air velocity, feet/second[b] | 2.0 | 2.0 | 2.0 | 2.0 |
| Jacket steam pressure, psig | 68 | 14 | 120 | 117 |
| Upper agitator rpm (15" diam)[g] | 42 | 42 | 42 | 42 |
| Lower agitator rpm (10" diam)[h] | 66 | 66 | 66 | 66 |
| Product moisture, % | 2.0 | 5.7 | 1.9 | 1.5 |
| Product solubles, % | 98.3 | 17.4 | 98.9 | 98.5 |
| Product fluidity, ml | 27[c] | 23[d] | 18[e] | 42[f] |

[a] scfm = standard cubic feet per minute.
[b] Based on inside tube diameter of 2.8 inches.
[c] 3:4 fluidity, as is.
[d] 1:3 10% borax fluidity, as is.
[e] 2:3 10% borax fluidity, as is.
[f] 1:2 10% borax fluidity, as is.
[g] Two 4 bladed upthrust impellers
[h] Three 4 bladed upthrust impellers The fluid bed apparatus contained 7 tubes, the tubes having an inside diameter of 2.8 inches. The height of each tube was 5 feet.

EXAMPLE 3

This example illustrates the use of the fluidization process of this invention in the drying of starch.

Using the equipment described in Example 1, starch having a moisture content of 12% by weight based on the weight of the starch, dry basis, is supplied to the inlet 14, and ambient dry air is introduced as the fluidizing gas.

Heat for the drying operation is supplied by feeding to the jacket 32 steam at 147 psig. The starch is fluidized for an average residence time of 15 minutes, and is dried to a moisture content of 3.3% by weight, dry basis.

The foregoing examples illustrate the use of the process of this invention in the dextrinization of starch and in the drying of starch. While Example 3 above illustrates what is known in the art as secondary drying of starch, that is reducing the moisture content of starch from about 10 to about 14% to 3 to about 5%, the process of this invention can also be employed in the drying of starch containing greater amounts of moisture. For example, the process of the invention can be employed in the drying of starch containing about 35% by weight moisture on a weight basis. In addition to starch, the process of this invention may also be employed in the drying of gluten, germ, corn syrup solids or sugars, dextrose, etc.

The process of this invention is likewise well suited for use in the preparation of starch derivatives. Such derivatives are formed by reaction of starch, containing up to 35% moisture on a dry basis with a variety of reagents in accordance with now well known reactions. Such derivatives are formed by reaction of starch as represented by with a number of reagents whereby the starch molecule is substituted at either the primary and/or secondary hydroxyl groups. For example, starch phosphates can be prepared by reaction of starch with an alkali metal tripolyphosphate whereby the starch forms a starch phosphate ester. In addition, cationic starches can be produced by reaction of starch with glycidyltrialkylammonium halides, preferably those having the structural formula

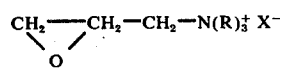

wherein R represents a lower alkyl group such as methyl, ethyl, propyl, etc. and X represents a halide ion. In addition, use can be made of other reagents to produce cationic starches, such as beta-halogenated amines including 2-dimethylaminoethyl chloride, 2-diethylaminoethyl chloride, 2-dimethylaminoisopropyl chloride, 2-diallylaminoethyl chloride, 2-diisopropylaminoethyl chloride, etc.

Anionic starch derivatives can be produced in the practice of this invention by reaction of starch with an alkali metal salt of an omega-halogenated substituted carboxylic acid. Preferred reagents for use in the preparation of anionic starches include sodium chloroacetate, sodium 2,3-epoxypropyl sulfonate, sodium 3-chloro-2-hydroxypropyl sulfonate or propiolactone. In the reactions as described above to produce anionic starches, the starch is contacted with the reagent in the presence of a basic catalyst to promote the reaction, as is well known to those skilled in the art.

Another reaction to which the process of this invention is ideally suited is the preparation of starch carbamate. In this reaction, urea is reacted with starch whereby the starch becomes substituted with carbamate groups

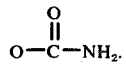

Other starch ethers can also be produced in the process of this invention in accordance with well known reactions. In such reactions, starch is reacted with, for example, acrylonitrile, acrylamide, methacrylamide, dialkylmethacrylamides, etc.

In carrying out each of the above-described reactions, it has generally been found preferred to contact starch, containing from 3 to 35% moisture by weight, with the reagent to be employed in the manufacture of the derivative to insure intimate admixture of the starch with such reagent. The starch containing the desired reagent is then supplied to the fluidized bed system in the practice of this invention, either to the upper fluidized zone or the lower fluidized zone as described above, and the reaction carried out as described in the examples to produce the desired starch derivative. In the practice of this invention, the desired conversion of the starch to the starch derivative is completed in a relatively short period of time, generally from 5 to 30 minutes in the fluidized system, while avoiding undesirable thermal degradation of starch as well as minimizing risks of fire and/or explosion as a result of overheating in the fluidized reactor system.

As illustrative of typical reactions, starch can be oxidized by blending the starch with a suitable oxidizing agent (NaOCl) in a ribbon blender in an amount sufficient to provide starch containing 1.0% oxidant expressed as chlorine on a dry solids basis. The resultant blend of starch and oxidant is then introduced to the fluidized bed through the inlet 14, and a suitable fluidizing gas, preferably air, is introduced to the plenum chamber 44.

The necessary heat to promote the oxidation reaction is supplied by contacting the plurality of tubular zones with a suitable heat exchange medium, such as steam, to heat the fluidized bed to the desired reaction temperature. The resulting oxidizing starch is then removed from the lower fluidized zone, having a Scott viscosity (100 g) of about 47 and a carboxyl value of 0.65.

It will be understood that the process of the present invention provides a significant improvement in the fluidization of materials which tend to be cohesive, and thus are difficult to fluidize. The process of the present invention is particularly well suited for the treatment of starch for the use of an agitated fluidized bed system including upper and lower mechanically agitated zones which serves to maintain homogeneity in the fluidized bed and to prevent scorching of the starch as it is passed through the tubular zones of the reactor. The process includes the use of an intermediate constricted heat exchange zone between the upper and lower agitated fluidized zones through which the starch undergoing processing is rapidly passed to prevent scorching of the starch.

It will also be understood by those skilled in the art that the process of the present invention is not limited to the process of starch. On the contrary, the process of the invention can be used in the treatment of various other materials which tend to be cohesive, and are thus difficult to fluidize.

While the invention has been described in connection with specific embodiments thereof, it will be understood that it is capable of further modification, and this application is intended to cover any variations, uses or adaptations of the invention following, in general, the principles of the invention and including such departures from the present disclosure as come within the known or customary practice in the art to which the invention pertains and as may be applied to the essential features hereinbefore set forth, and as falls within the scope of the invention.

I claim:
1. A fluidization process for fluidizing solids comprising the steps of
   a. simultaneously feeding solids to an upper fluidized zone while continuously subjecting the solids in the upper fluidized zone to mechanical agitation,
   b. passing the agitated, fluidized solids in the upper fluidized zone downwardly against the fluidizing gas through a plurality of tubular fluidized zones into a lower fluidized zone while mechanically agitating the solids in the lower fluidized zone, and
   c. contacting the tubular zones with heat exchange media to effect heat transfer with the solids fluidized in the tubular fluidized zones.
2. A process as defined in claim 1 wherein the fluidizing gas is supplied to the lower fluidized zone and is passed upwardly through the lower fluidized zone, through the tubular zones, and into the fluidized zone.
3. A process as defined in claim 1 wherein each tubular zone has a cross sectional area less than the cross sectional area of the upper fluidized zone and the lower fluidized zone.
4. A process as defined in claim 1 wherein the heat transfer with the tubular zones includes heating the tubular zones.
5. A process as defined in claim 1 wherein the solids are group C solids.
6. A fluidization process for fluidizing solids which are cohesive comprising the steps of
   a. simultaneously feeding solids to an upper fluidized zone while continuously subjecting the solids in the upper fluidized zone to mechanical agitation,
   b. passing the agitated, fluidized solids in the upper fluidized zone downwardly against the fluidizing gas through a plurality of tubular fluidized zones into a lower fluidized zone while mechanically agitating the solids in the lower fluidized zone, and
   c. contacting the tubular zones with heat exchange media to effect heat transfer with the solids fluidized in the tubular fluidized zones.
7. A process as defined in claim 6 wherein the fluidizing gas is supplied to the lower fluidized zone and is passed upwardly through the lower fluidized zone, through the tubular zones, and into the upper fluidized zone.
8. A process as defined in claim 6 wherein each tubular zone has a cross sectional area less than the cross sectional area of the upper fluidized zone and the lower fluidized zone.
9. A process as defined in claim 6 wherein the heat transfer with the tubular zones includes heating the tubular zones.
10. A fluidization process for fluidizing solids comprising the steps of
    a. simultaneously feeding solids to a lower fluidized zone while continuously subjecting the solids in the lower fluidized zone to mechanical agitation,
    b. passing the agitated, fluidized solids in the lower fluidized zone upwardly with the fluidizing gas through a plurality of tubular fluidized zones into an upper fluidized zone while mechanically agitating the solids in the upper fluidized zone, and c. contacting the tubular zones with heat exchange media to effect heat transfer with the solids fluidized in the tubular fluidized zones.

11. A process as defined in claim 10 wherein the fluidizing gas is supplied to the lower fluidized zone and is passed upwardly through the lower fluidized zone, through the tubular zones, and into the upper fluidized zone.

12. A process as defined in claim 10 wherein each tubular zone has a cross sectional area less than the cross sectional area of the upper fluidized zone and the lower fluidized zone.

13. A process as defined in claim 10 wherein the heat transfer with the tubular zones includes heating the tubular zones.

14. A process as defined in claim 10 wherein the solids are group C solids.

15. A fluidization process for fluidizing solids which are cohesive comprising the steps of a. simultaneously feeding solids to a lower fluidized zone while continuously subjecting the solids in the lower fluidized zone to mechanical agitation, b. passing the agitated, fluidized solids in the lower fluidized zone upwardly with the fluidizing gas through a plurality of tubular fluidized zones into an upper fluidized zone while mechanically agitating the solids in the upper fluidized zone, and c. contacting the tubular zones with heat exchange media to effect heat transfer with the solids fluidized in the tubular fluidized zones.

16. A process as defined in claim 15 wherein the fluidizing gas is supplied to the lower fluidized zone and is passed upwardly through the lower fluidized zone, through the tubular zones, and into the upper fluidized zone.

17. A process as defined in claim 15 wherein each tubular zone has a cross sectional area less than the cross sectional area of the upper fluidized zone and the lower fluidized zone.

18. A process as defined in claim 15 wherein the heat transfer with the tubular zones includes heating the tubular zones.

19. A fluidization process for fluidizing starch comprising the steps of a. simultaneously feeding starch to an upper fluidized zone while continuously subjecting the starch in the upper fluidized zone to mechanical agitation, b. passing the agitated, fluidized starch in the upper fluidized zone downwardly against the fluidizing gas through a plurality of tubular fluidized zones into a lower fluidizing zone while mechanically agitating the starch in the lower fluidized zone, and c. contacting the tubular zones with heat exchange media to effect heat transfer with the starch fluidized in the tubular fluidized zones.

20. A process as defined in claim 19 wherein the fluidizing gas is supplied to the lower fluidized zone and is passed upwardly through the lower fluidized zone, through the tubular zones, and into the upper fluidized zone.

21. A process as defined in claim 19 wherein each tubular zone has a cross sectional area less than the cross sectional area of the upper fluidized zone and the lower fluidized zone.

22. A process as defined in claim 19 wherein the heat transfer with the tubular zones includes heating the tubular zones.

23. A fluidization process for fluidizing starch comprising the steps of a. simultaneously feeding starch to a lower fluidized zone while continuously subjecting the starch in the lower fluidized zone to mechanical agitation, b. passing the agitated, fluidized starch in the lower fluidized zone upwardly with the fluidizing gas through a plurality of tubular fluidized zones into an upper fluidized zone while mechanically agitating the starch in the upper fluidized zone, and c. contacting the tubular zones with heat exchange media to effect heat transfer with the starch fluidized in the tubular fluidized zones.

24. A process as defined in claim 23 wherein the fluidizing gas is supplied to the lower fluidized zone and is passed upwardly through the lower fluidized zone, through the tubular zones, and into the upper fluidized zone.

25. A process as defined in claim 23 wherein each tubular zone has a cross sectional area less than the cross sectional area of the upper fluidized zone and the lower fluidized zone.

26. A process as defined in claim 23 wherein the heat transfer with the tubular zones includes heating the tubular zones.

27. A process for fluidized drying of solids comprising the steps of a. simultaneously feeding solids to an upper fluidized zone while continuously subjecting the solids in the upper fluidized zone to mechanical agitation, b. passing the agitated, fluidized solids in the upper fluidized zone downwardly against the fluidizing gas through a plurality of tubular fluidized zones into a lower fluidized zone while mechanically agitating the solids in the lower fluidized zone, and c. contacting the tubular zones with heat exchange media to effect heat transfer with the solids fluidized in the tubular fluidized zones.

28. A process as defined in claim 27 wherein the fluidizing gas is supplied to the lower fluidized zone and is passed upwardly through the lower fluidized zone, through the tubular zones, and into the upper fluidized zone.

29. A process as defined in claim 27 wherein each tubular zone has a cross sectional area less than the cross sectional area of the upper fluidized zone and the lower fluidized zone.

30. A process as defined in claim 27 wherein the heat transfer with the tubular zones includes heating the tubular zones.

31. A process as defined in claim 27 wherein the solids are group C solids.

32. A process for the fluidized drying of solids comprising the steps of a. simultaneously feeding solids to a lower fluidized zone while continuously subjecting the solids in the lower fluidized zone to mechanical agitation, b. passing the agitated fluidized solids in the lower fluidized zone upwardly with the fluidizing gas through a plurality of tubular fluidized zones into an upper fluidized zone while mechanically agitating the solids in the upper fluidized zone, and c. contacting the tubular zones with heat exchange media to effect heat transfer with the solids fluidized in the tubular fluidized zones.

33. A process as defined in claim 32 wherein the fluidizing gas is supplied to the lower fluidized zone and is passed upwardly through the lower fluidized zone, through the tubular zones, and into the upper fluidized zone.

34. A process as defined in claim 32 wherein each tubular zone has a cross sectional area less than the cross sectional area of the upper fluidized zone and the lower fluidized zone.

35. A process as defined in claim 32 wherein the heat transfer with the tubular zones includes heating the tubular zones.

36. A process as defined in claim 32 wherein the solids are group C solids.

37. A process for the fluidized drying of starch comprising the steps of
 a. simultaneously feeding starch to an upper fluidized zone while continuously subjecting the starch in the upper fluidized zone to mechanical agitation,
 b. passing the agitated, fluidized starch in the upper fluidized zone downwardly against the fluidizing zones into a lower fluidized zone while mechanically agitating the starch in the lower fluidized zone, and
 c. contacting the tubular zones with heat exchange media to effect heat transfer with the starch fluidized in the tubular fluidized zones.

38. A process as defined in claim 37 wherein the fluidizing gas is supplied to the lower fluidized zone and is passed upwardly through the lower fluidized zone, through the tubular zones, and into the upper fluidized zone.

39. A process as defined in claim 37 wherein each tubular zone has a cross sectional area less than the cross sectional area of the upper fluidized zone and the lower fluidized zone.

40. A process as defined in claim 37 wherein the heat transfer with the tubular zones includes heating the tubular zones.

41. A process for the fluidized drying of starch comprising the steps of
 a. simultaneously feeding starch to a lower fluidized zone while continuously subjecting the starch in the lower fluidized zone to mechanical agitation,
 b. passing the agitated fluidized starch in the lower fluidized zone upwardly with the fluidizing gas through a plurality of tubular fluidized zones into an upper fluidized zone while mechanically agitating the starch in the upper fluidized zones, and
 c. contacting the tubular zones with heat exchange media to effect heat transfer with the starch fluidized in the tubular fluidized zones.

42. A process as defined in claim 41 wherein the fluidizing gas is supplied to the lower fluidized zone and is passed upwardly through the lower fluidized zone, through the tubular zones, and into the upper fluidized zone.

43. A process as defined in claim 41 wherein each tubular zone has a cross sectional area less than the cross sectional area of the upper fluidized zone and the lower fluidized zone.

44. A process as defined in claim 41 wherein the heat transfer with the tubular zones includes heating the tubular zones.

45. A fluidization process for the preparation of starch derivatives comprising the steps of
 a. simultaneously feeding starch blended with a reactant capable of reaction with starch to produce the desired derivative to an upper fluidized zone while continuously subjecting the starch in the upper fluidized zone to mechanical agitation,
 b. passing the agitated, fluidized starch blended with said reactant in the upper fluidized zone downwardly against the fluidizing gas through a plurality of tubular fluidized zones into a lower fluidized zone while mechanically agitating the starch in the lower fluidized zone,
 c. contacting the tubular zones with heat exchange media to effect heat transfer with the starch blended in the tubular fluidized zones, and
 d. recovering the starch derivative.

46. A process as defined in claim 45 wherein the fluidizing gas is supplied to the lower fluidized zone and is passed upwardly through the lower fluidized zone, through the tubular zones, and into the upper fluidized zone.

47. A process as defined in claim 45 wherein each tubular zone has a cross sectional area less than the cross sectional area of the upper fluidized zone and the lower fluidized zone.

48. A process as defined in claim 45 wherein the heat transfer with the tubular zones includes heating the tubular zones.

49. A process as defined in claim 45 wherein the reactant is a glycidyltrialkylammonium halide, and the starch derivative formed is a cationic starch.

50. A process as defined in claim 45 wherein the reactant is an alkali metal tripolyphosphate, and the starch derivative is a starch phosphate ester.

51. A process as defined in claim 45 wherein the reactant is urea, and the starch derivative is a starch carbamate.

52. A fluidization process as defined in claim 45 wherein said reactant is an acid catalyst to convert the starch to starch dextrin.

53. A fluidization process as defined in claim 52 wherein the acid catalyst is HCl, and the starch is heated to a temperature within the range of 125° F to 380° F.

* * * * *

UNITED STATES PATENT AND TRADEMARK OFFICE
CERTIFICATE OF CORRECTION

PATENT NO. : 4,021,927
DATED : May 10, 1977
INVENTOR(S) : Leo R. Idaszak

It is certified that error appears in the above-identified patent and that said Letters Patent are hereby corrected as shown below:

Column 14, lines 39-45: The formula should read:

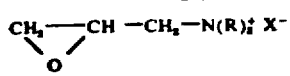

Column 16, line 26, should read "through the tubular zones, and into the upper fluidized zone."

Figure 1 and the figure on the title page: The numeral "4⁹" should read "49".

Signed and Sealed this

Fourteenth Day of February 1978

[SEAL]

Attest:

RUTH C. MASON
Attesting Officer

LUTRELLE F. PARKER
Acting Commissioner of Patents and Trademarks